(12) United States Patent
Willes et al.

(10) Patent No.: US 7,599,002 B2
(45) Date of Patent: Oct. 6, 2009

(54) NETWORK CAMERA MOUNTING SYSTEM

(75) Inventors: W. Paul Willes, Alpine, UT (US); Thomas R. Rohlfing, Salt Lake City, UT (US); Harold L. Simonsen, South Jordan, UT (US); Jeffrey B. Lancaster, Riverton, UT (US); Andrew J. Hartsfield, Draper, UT (US); Evan I. Tree, Sandy, UT (US)

(73) Assignee: Logitech Europe S.A. (CH)

( * ) Notice: Subject to any disclaimer, the term of this patent is extended or adjusted under 35 U.S.C. 154(b) by 676 days.

(21) Appl. No.: 10/774,954

(22) Filed: Feb. 9, 2004

(65) Prior Publication Data

US 2005/0117052 A1 Jun. 2, 2005

(51) Int. Cl.
*H04N 5/225* (2006.01)
(52) U.S. Cl. .................. 348/375; 348/373; 348/151
(58) Field of Classification Search .......... 348/143, 348/207.1, 207.11, 207.99, 211.99, 211.1, 348/375, 211.3, 373, 552, 142, 372, 335, 348/340, 151; 248/683, 549, 466, 467, 489, 248/206.2, 206.3, 206.4, 309.3; 396/419, 396/421, 424, 427, 428; 211/87.01, 75
See application file for complete search history.

(56) References Cited

U.S. PATENT DOCUMENTS

| | | | | |
|---|---|---|---|---|
| 4,863,130 | A | * | 9/1989 | Marks, Jr. ........... 248/206.3 |
| 5,095,480 | A | | 3/1992 | Fenner |
| 5,137,238 | A | | 8/1992 | Hutten ................ 248/206.3 |
| 5,208,624 | A | * | 5/1993 | MacKay ................. 396/544 |
| 5,392,223 | A | | 2/1995 | Caci |
| 5,495,288 | A | | 2/1996 | Broady et al. |
| 5,515,377 | A | | 5/1996 | Horne et al. |
| 5,541,852 | A | | 7/1996 | Eyuboglu et al. |
| 5,544,327 | A | | 8/1996 | Dan et al. |
| 5,557,320 | A | | 9/1996 | Krebs |
| 5,600,797 | A | | 2/1997 | Marshall |
| 5,621,660 | A | | 4/1997 | Chaddha et al. |
| 5,729,535 | A | | 3/1998 | Rostoker et al. |
| 5,764,235 | A | | 6/1998 | Hunt et al. |

(Continued)

FOREIGN PATENT DOCUMENTS

JP  2002-025190  1/2002

OTHER PUBLICATIONS

PCT International Search Report and Written Opinion, PCT/US05/04137, Oct. 8, 2007, 10 pages.

(Continued)

*Primary Examiner*—Nhan T Tran
*Assistant Examiner*—Nelson D Hernandez Hernandez
(74) *Attorney, Agent, or Firm*—The Law Office of Deepti Panchawagh-Jain

(57) ABSTRACT

This invention allows a video network camera to be mounted directly against a window or other transparent surface without any additional mounting hardware. The network camera can be mounted both inside and outside of a window without additional mounting hardware. A novel mounting apparatus in conjunction with an adjustable video sensor allows the user to quickly mount and make adjustments to the viewing angle of the network camera, thus reducing installation time and installation costs. In addition, the network camera can be mounted to walls, ceilings and other surfaces as necessary by using a second mounting assembly.

7 Claims, 17 Drawing Sheets

U.S. PATENT DOCUMENTS

| | | | |
|---|---|---|---|
| 5,784,572 | A | 7/1998 | Rostoker et al. |
| 5,793,416 | A | 8/1998 | Rostoker et al. |
| 5,904,330 | A * | 5/1999 | Manico et al. ........... 248/206.3 |
| 5,983,261 | A | 11/1999 | Riddle |
| 6,014,694 | A | 1/2000 | Aharoni et al. |
| 6,078,958 | A | 6/2000 | Echeita et al. |
| 6,081,422 | A * | 6/2000 | Ganthier et al. ............. 361/686 |
| 6,088,360 | A | 7/2000 | Amaral et al. |
| 6,091,777 | A | 7/2000 | Guetz et al. |
| 6,118,817 | A | 9/2000 | Wang |
| 6,122,673 | A | 9/2000 | Basak et al. |
| 6,137,958 | A * | 10/2000 | Toyoda ........................ 396/65 |
| 6,170,955 | B1 * | 1/2001 | Campbell et al. ........... 359/509 |
| 6,175,300 | B1 * | 1/2001 | Kendrick .................... 340/436 |
| 6,178,025 | B1 | 1/2001 | Hardcastle et al. |
| 6,205,499 | B1 | 3/2001 | Houlberg et al. |
| 6,268,882 | B1 | 7/2001 | Elberbaum |
| 6,289,054 | B1 | 9/2001 | Rhee |
| 6,323,897 | B1 | 11/2001 | Kogane et al. |
| 6,337,928 | B1 | 1/2002 | Takahashi et al. |
| 6,446,126 | B1 | 9/2002 | Huang et al. |
| 6,476,858 | B1 | 11/2002 | Ramirez et al. |
| 6,505,239 | B1 | 1/2003 | Kobata et al. |
| 6,507,672 | B1 | 1/2003 | Watkins et al. |
| 6,522,352 | B1 | 2/2003 | Strandwitz et al. |
| 6,570,606 | B1 | 5/2003 | Sidhu et al. |
| 6,594,277 | B1 | 7/2003 | Chiang et al. |
| 6,611,503 | B1 | 8/2003 | Fitzgerald et al. |
| 6,705,774 | B2 * | 3/2004 | Tashiro et al. ............... 396/427 |
| 6,731,723 | B1 | 5/2004 | Garey |
| 6,768,868 | B1 * | 7/2004 | Schnell ........................ 396/263 |
| 6,784,924 | B2 * | 8/2004 | Ward et al. ............... 348/207.1 |
| 6,787,775 | B1 * | 9/2004 | Bielefeld et al. ............. 250/330 |
| 6,792,323 | B2 | 9/2004 | Krzyzanowski et al. |
| 6,812,970 | B1 * | 11/2004 | McBride .................... 348/372 |
| 6,842,768 | B1 | 1/2005 | Shaffer et al. |
| 2002/0004827 | A1 | 1/2002 | Ciscon et al. |
| 2002/0018450 | A1 | 2/2002 | McKenna et al. |
| 2002/0078463 | A1 | 6/2002 | Foster |
| 2002/0141657 | A1 * | 10/2002 | Novak ........................ 382/282 |
| 2002/0158991 | A1 | 10/2002 | Kobayashi et al. |
| 2002/0163588 | A1 | 11/2002 | Holmberg ................... 348/373 |
| 2002/0179787 | A1 | 12/2002 | Nakatani ................. 248/187.1 |
| 2003/0039390 | A1 | 2/2003 | Yagishita et al. |
| 2003/0039398 | A1 | 2/2003 | McIntyre |
| 2003/0043908 | A1 | 3/2003 | Gao |
| 2003/0076441 | A1 | 4/2003 | Maeda et al. ............... 348/375 |
| 2003/0107648 | A1 | 6/2003 | Stewart et al. |
| 2003/0112335 | A1 * | 6/2003 | Strandwitz et al. ........ 348/211.2 |
| 2003/0140159 | A1 | 7/2003 | Campbell et al. |
| 2003/0142215 | A1 | 7/2003 | Ward et al. |
| 2005/0018766 | A1 | 1/2005 | Iwamura |
| 2005/0267605 | A1 | 12/2005 | Lee et al. |
| 2006/0272017 | A1 | 11/2006 | Largman et al. |

OTHER PUBLICATIONS

Abad, J. et al., "Extending the Power Line LAN Up To the Neighborhood Transformer," Communications Magazine, IEEE, Apr. 2003, pp. 64-70, vol. 41, No. 4.

Zhiruo, C. "Utility max-min: an application-oriented bandwidth allocation scheme", INFOCOM '99. Eighteenth Annual Joint Conference of the IEEE Computer and Communications Societies. Proceedings. IEEE, vol. 2, 793-801 pages.

Mukherjee, S. et al., "A bandwidth allocation scheme for time constrained message transmission on a slotted ring LAN", Real-Time Systems Symposition. Proceedings., 44-53 pages.

PCT/US04/40358, "International Preliminary Report on Patentability, mailed on Jun. 25, 2007", 5.

PCT/US2005/004137, "International Preliminary Report on Patentability", mailed on Aug. 8, 2008, 10 pages.

2005800041759, "Office Action Received for Chinese Application No. 2005800041759 mailed on Jan. 9, 2009", 3 pages.

Kramer, G. et al., "Ethernet Passive Optical Network (EPON)," Communications Magazine, IEEE, Feb. 2002, pp. 66-73, vol. 40, Issue 2.

PCT Notification of International Search Report and Written Opinion, PCT/US04/40358, Feb. 9, 2007, 11 pages.

* cited by examiner

NETWORK CAMERA MOUNTING SYSTEM

CROSS REFERENCE TO RELATED APPLICATIONS

This application is a continuation in part application claiming priority related to currently pending, co-pending, co-owned U.S. patent application Ser. No. 10/725,844, filed on Dec. 2, 2003, having common inventor(s).

BACKGROUND OF THE INVENTION

1. Field of the Invention

This invention relates to camera mounting systems. More specifically, this invention relates to camera mounting systems for networked network cameras.

2. Description of Related Art

A variety of network camera mounting systems are used to secure a network camera to a surface such as a wall, ceiling, or window. Typically, such systems require complex mounting and adjustment hardware. The mounting hardware is used to adjust the camera for the proper viewing angle. In addition, many of these systems require different mounting hardware depending on which direction the camera is facing, inward or outward, and these systems don't account for the need to flush mount a low profile camera to a window, nor do they typically provide special consideration for glare shielding for the window surface and/or interference from window coverings. Although these references may not constitute prior art, for general background material, the reader is directed to the following U.S. patent documents, each of which is hereby incorporated by reference in its entirety for the material contained therein: U.S. patent and patent application numbers: 2003/0076441, 2003/0058363, 2003/0156836, 2003/0106971, 2003/0057339, 2003/0012571, 2003/0025802, 2002/0163588, 2002/0179787, 2002/0162867, U.S. Pat. Nos. 6,439,515, 6,392,693, 6,130,704, 6,115,068, 5,926,209, 5,802,412, 5,510,863, 5,426,476, and 5,137,238.

SUMMARY OF THE INVENTION

It is desirable to provide a network camera mounting system that allows a network camera to be easily mounted and controlled over a network.

Therefore, it is a general object of the present embodiment of this invention to provide a network camera and mounting system with an adjustable video sensor assembly where the viewing angle can be adjusted manually, electronically, and/or mechanically either locally or remotely and where a low profile network camera can be flush to a window or transparent surface, flat mounted, or mounted to a wall, ceiling and the like.

t is a further object of an embodiment of this invention to provide a network camera and mounting system which has a mounting point which can be on the front, side, top, bottom, and rear, and rear bottom of the network camera.

It is a further object of an embodiment of this invention to provide a network camera and mounting system which has a clip-on mounting point which holds a clip-on mounting assembly which can connect to a surface using a suction cup and the like.

It is a further object of an embodiment of this invention to provide a network camera and mounting system where the mounting points connect to a mounting assembly by using threads, screws, snaps, rivets, plugs, Velcro, connectors, pins and/or the like.

It is a further object of an embodiment of this invention to provide a network camera and mounting system where the mounting assembly connected to the network camera can be, but is not limited to a suction cup mounting assembly, a multi-purpose suction cup mounting assembly, a multi-purpose flat mounting assembly and/or a bracket mounting assembly.

It is a further object of an embodiment of this invention to provide a network camera and mounting system where the adjustable video sensor can be adjusted remotely over a network.

It is a further object of an embodiment of this invention to provide a network camera and mounting system where the video sensor assembly where the image sensor resolution and/or optics (wide angle) can be adjusted remotely over a network.

It is a further object of an embodiment of this invention to provide network camera system that can connect to a wireless network, a power line network (where data is networked over the power lines in a home, business, etc.), an acoustic network (where signals are sent acoustically), a wired network, the Internet, a local area network, a wide area network, and/or an optical network (where the data is sent over an optical medium such as fiber).

It is a further object of an embodiment of this invention to provide a network camera and mounting system where the network camera is weather proof.

It is a further object of an embodiment of this invention to provide a network camera and mounting system where the camera is powered using solar power, battery power, AC and/or DC power.

It is a further object of an embodiment of this invention to provide a network camera and mounting system where a cover is connected to the rear of the network camera to hide the features of the camera and the camera itself.

It is a further object of an embodiment of this invention to provide a network camera and mounting system where the video sensor assembly also includes a camera lens.

It is a further object of an embodiment of this invention to provide a network camera and mounting system where the camera views images through a glare shield and/or a transparent medium.

It is a further object of an embodiment of this invention to provide a network camera and mounting system where the glare shield is flush mounted to a window or transparent medium to avoid glare.

It is a further object of an embodiment of this invention to provide a network camera and mounting system where the transparent medium is a window.

It is a further object of an embodiment of this invention to provide a network camera and mounting system where the network camera is connected to a network device that converts from one or more networking protocols to a second type of networking protocol and/or network.

It a is further object of an embodiment of this invention to provide a network camera and mounting system where the network camera is connected to a network device that can be a router, a switch, a hub, a bridge, a gateway, a power line adapter, and the like.

It a is further object of an embodiment of this invention to provide a network camera and mounting system where the network camera is connected to a network device that can also provide power where the power is provided on the wire as for example, the data like power over Ethernet.

These and other objects of this invention will be readily apparent to those of ordinary skill in the art upon review of the following drawings, detailed descriptions, and claims. In the present preferred embodiment of this invention, the network camera mounting system makes use of a simple, yet novel mounting system that allows a network camera to be easily mounted in different ways without requiring extra mounting hardware.

BRIEF DESCRIPTION OF DRAWINGS

In order to show the manner in which the above-recited and other advantages and objects of the invention are obtained, a more particular description of the present preferred embodiments of this invention, which are illustrated in the appended drawings, is described as follows. The reader should understand that the drawings depict only present preferred and best mode embodiments of the invention, and are not to be considered as limiting in scope. A brief description of the drawings is as follows.

Reference will now be made in detail to the present preferred embodiments of the invention, examples of which are illustrated in the accompanying drawings.

DETAILED DESCRIPTION

Figure 1:
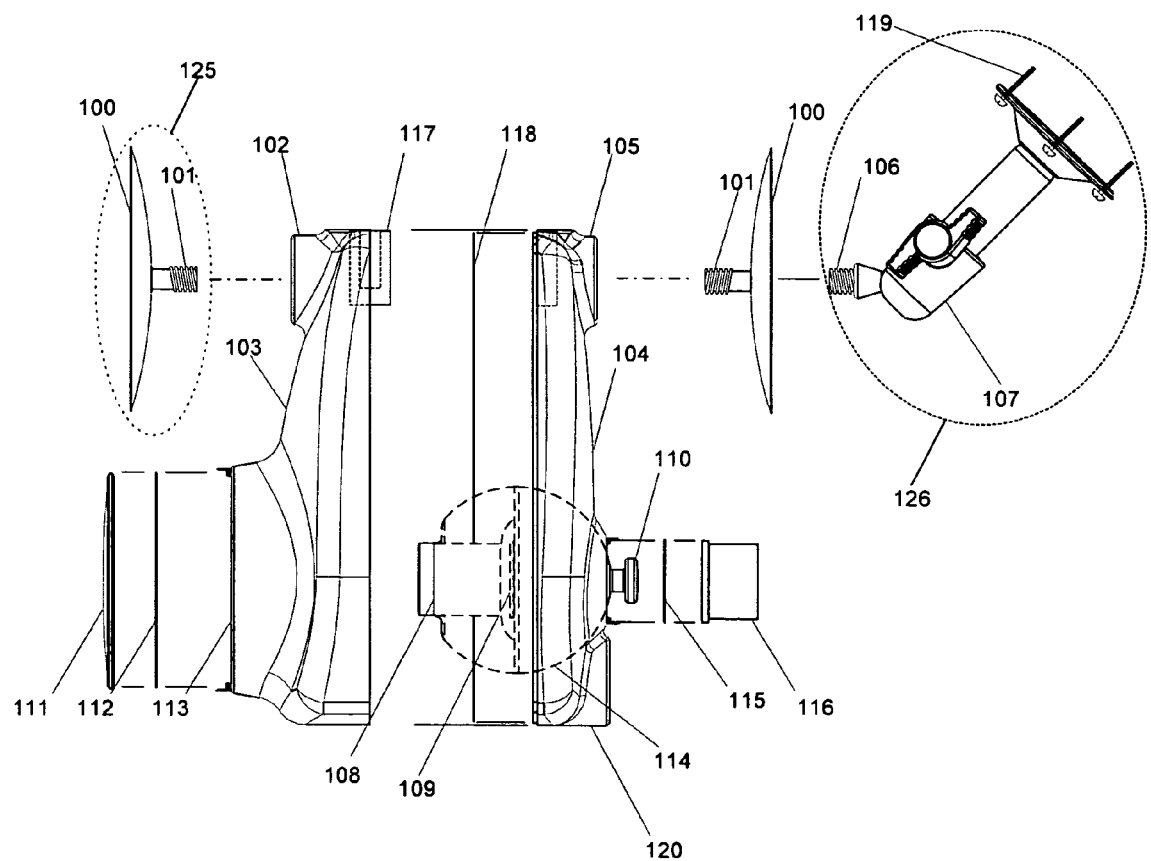
FIG. 1 is an exploded side view of the present preferred network camera.

FIG. 1 is an exploded side view of the present preferred network camera 300. A front attachment point 102 which is connected to a front housing shell 103 fit together with a rear housing shell 104 which is connected to a rear attachment point 105 by pressing the front housing shell 103 and the rear housing shell 104 together with a housing shell gasket 118. The front housing shell 103 and the rear housing 104 shell form a low profile housing. This way the network camera 300 interferes less with curtains blinds and/or other types of window coverings. The low profile housing also allows the network camera 300 to minimize the visual exposure behind curtains, blinds, and/or other types of window coverings and the like. In the preferred embodiment, the low profile housing uses two housing shells. However, in other envisioned embodiments, the housing shell can be made from one or more components to form a low profile housing. The housing shell gasket 118 is used to make the network camera 300 weather resistant or weather proof. A network and/or power interface 117, along with an adjustable video assembly 114 is provided inside the housing shells 103, 104 when the unit is assembled. The network and/or power interface 117 is used to connect the network camera 300 to a network and/or to power the network camera 300. Types of networks appropriate for use with the network camera 300 can be, but are not limited to Ethernet, wireless, wired, power line (a network over the power line like HomePlug), fiber optic, the Internet, a LAN, Power Over Ethernet (POE), and the like. Sources of electrical power which can power the network camera 300 can be, but are not limited to solar, batteries, AC, and DC.

The adjustable video sensor assembly 114 contains an image sensor 109, a network camera lens 108 and positioning knob 110. The image sensor 109 can take single pictures and/or full motion video. Images received on the image sensor 109 can be transmitted over the network interface 301 and/or antenna 201. The positioning knob 110 is used to adjust the viewing angle of the image sensor 109 and the network camera lens 108. The adjustable video sensor assembly 114 can also be adjusted (pan, tilt, and/or zoom) using motors, coils, or other devices which can be remotely controlled over a network. The adjustable video sensor assembly 114 can be augmented and/or substituted by either manual, mechanical or electronic adjustment capabilities of the sensor and associated electronics utilizing the resolution or the image sensor 109 to create the affects of pan, tilt, and/or zoom in conjunction with a wide angle network camera lens assembly 108.

A positioning knob cover 116 along with a positioning knob cover O ring 115 are used to seal and cover the positioning knob 110 from weather and/or moisture. The knob cover O ring 115 can also be a gasket or the like. The network camera lens assembly 108 sees through an opening in the front housing shell 103. A glare shield 113 can be used to reduce glare that can be seen by the image sensor 109. Glare can be caused when the network camera 300 is positioned close or flush to a window or other transparent medium, particularly at night. The glare shield 113 is designed to fit next the window or transparent medium. The glare shield 113 covers the hole 303 in the front housing shell 103. A clear lens cap 111 along with the lens cap O ring 112 cover the hole 303 in the front housing shell 103. The lens cap O ring 112 can also be a gasket and the like. The clear lens cap 111 and lens cap O ring 112 allows the network camera 300 to be weatherproof or weather resistant.

A suction cup, 100 which is connected to a suction cup attachment 101, which together forms a suction cup mounting assembly 125. A surface bracket unit 107 and a surface bracket unit attachment 106 together along with the mounting screws 119 form a bracket unit mounting assembly 126. The Surface bracket unit 107 and surface bracket unit attachment 106 operate together to form an adjustable angle for the mounting assembly 126. The preferred embodiment uses threads on the suction cup attachment 101, the mounting unit attachment 106 and the corresponding attachment points 102, 105. However, in other envisioned alternative embodiments, other types of fastening devices can be used in place of screws such as but not limited to snaps, rivets, plugs, Velcro, connectors, pins, and the like. The suction cup mounting assembly 125 and the bracket mounting assembly 126 can be connected to either the front attachment point 102 or the rear attachment point 105. The suction cup mounting assembly 125 and the bracket mounting assembly 126 can be directly connected to the housing shells 103, 104 without an attachment point 102, 105. The housing shells 103, 104, along with the adjustable video sensor assembly 114 and associated electronics, connectors, and cables contained within the shell form the network camera 300.

Figure 2:
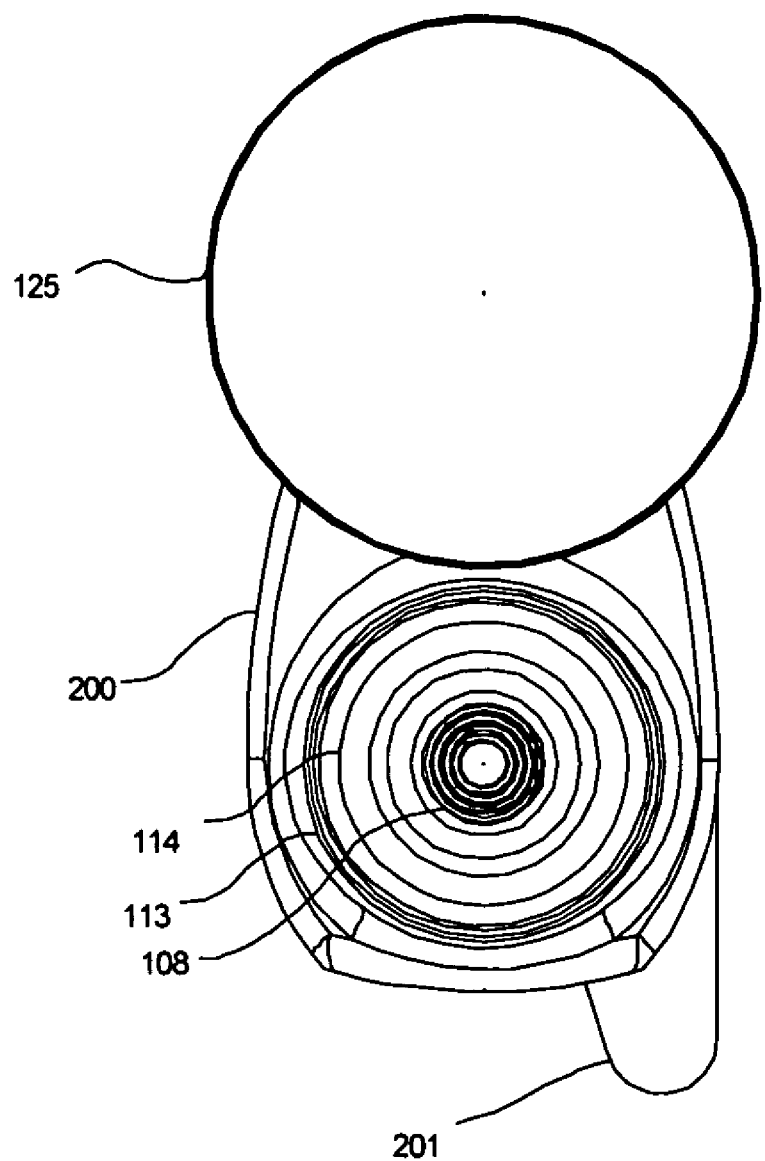
FIG. 2 is a front view of the present preferred wireless network camera with a suction cup mounting assembly.

FIG. 2 is a front view of the present preferred wireless network camera 200 with a suction cup mounting assembly 125. The adjustable video sensor assembly 114 can see through the network camera lens 108 protected by the glare shield 113. The wireless network camera 200 communicates to a wireless network via an antenna 201. The antenna 201 is a type of network interface. Types of wireless networks can be, but are not limited to 802.11 b, 802.11 a, 802.15(UWB), cellular, and the like. The wireless network camera 200 attaches to a surface such as a window via the suction cup mounting assembly 125 which is attached to the front attachment point 102. The wireless network camera 200 can alternately be mounted via attachment points 102, 105, 117, 120.

Figure 3:
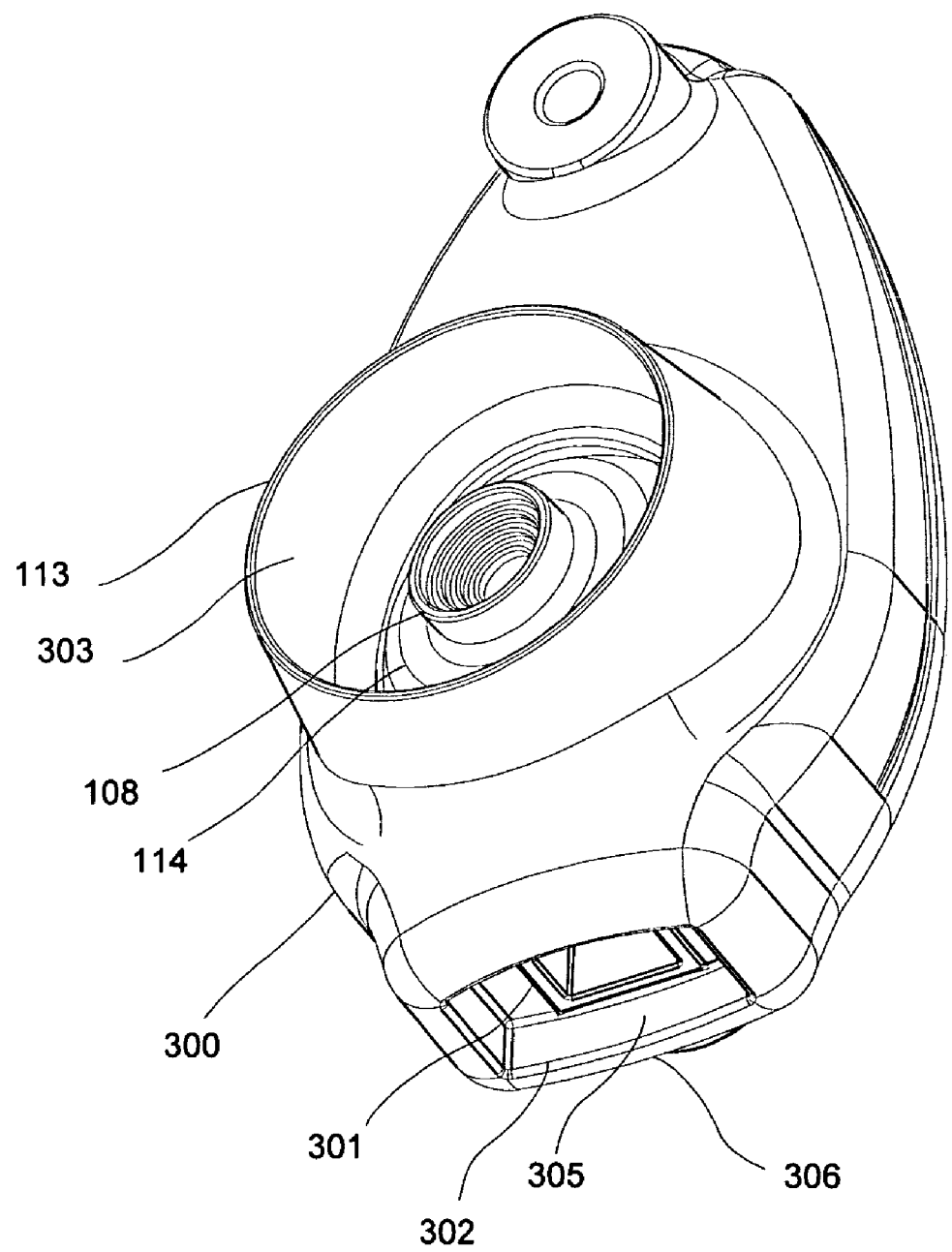
FIG. 3 is a front view of the present preferred wired network camera with a suction cup mounting assembly which demonstrates the proper mounting for outdoor use.

FIG. 3 is a front view of the present preferred wired network camera 300 with a suction cup mounting assembly 125 which illustrates the protected, recessed network interface 301 positioned downward to protect against weather. The cavity 305 protecting the network interface 301 is protected by a weather shield 302. The network interface 301 can be, but is not limited to Ethernet, wireless, wired, power line (a network over the power line like HomePlug), fiber optic, the Internet, a LAN, Power Over Ethernet (POE), and the like. The gasket 118 fits between the two network camera shell halves 103, 104, preferably all the way down to the lowest point 306 such that moisture would have to drip upwards to get to the connector.

The adjustable video sensor assembly 114 can see through the network camera lens 108 protected by the glare shield 113. The network camera 300 communicates through a wire to a network via the network and/or power interface 117. The network can be directly wired such as Ethernet or via additional units to make up a wired, wireless, power line communications, IR, etc. The network camera 300 attaches to a surface (not shown) via the suction cup mounting assembly 125 or via any of the attachment points 102, 105, 117, 120. The network and/or power interface 117 points downward to minimize the moisture can enter the network camera 300.

Figure 4:
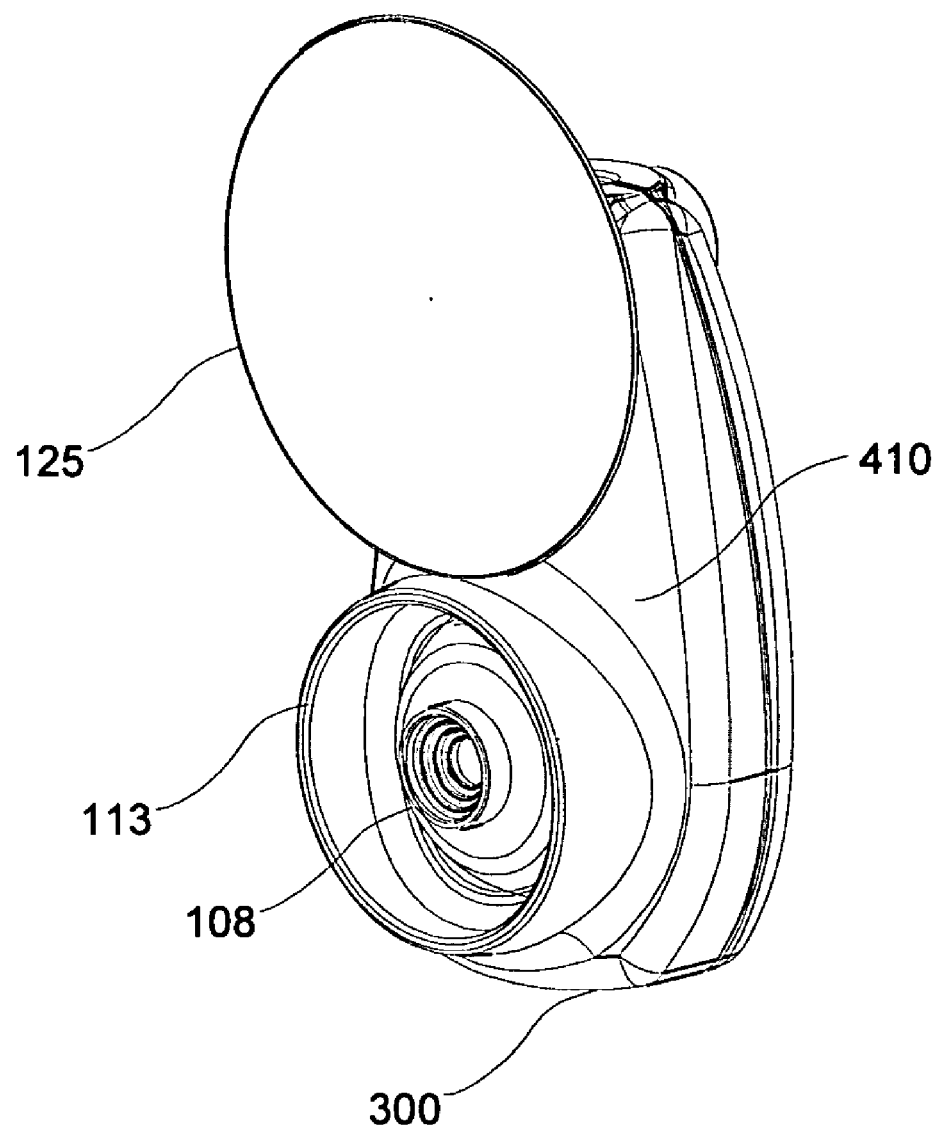
FIG. 4 is an angled view of the present preferred wired network camera with a suction cup mounted on the front of the network camera.

FIG. 4 is an angled view of the present preferred wired network camera 300 and network camera mounting system with a suction cup mounting assembly 125 on the front 410 of the network camera 300. The suction cup mounting assembly 125 is mounted on the front 410 of the network camera 300 at the front attachment point 102. The network camera lens 108 sees through the glare shield 113. The network camera 300 attaches to a surface (not shown) via the suction cup mounting assembly 125. This allows the network camera 300 to view information through a transparent surface (not shown) on which the network camera 300 is attached.

Figure 5:
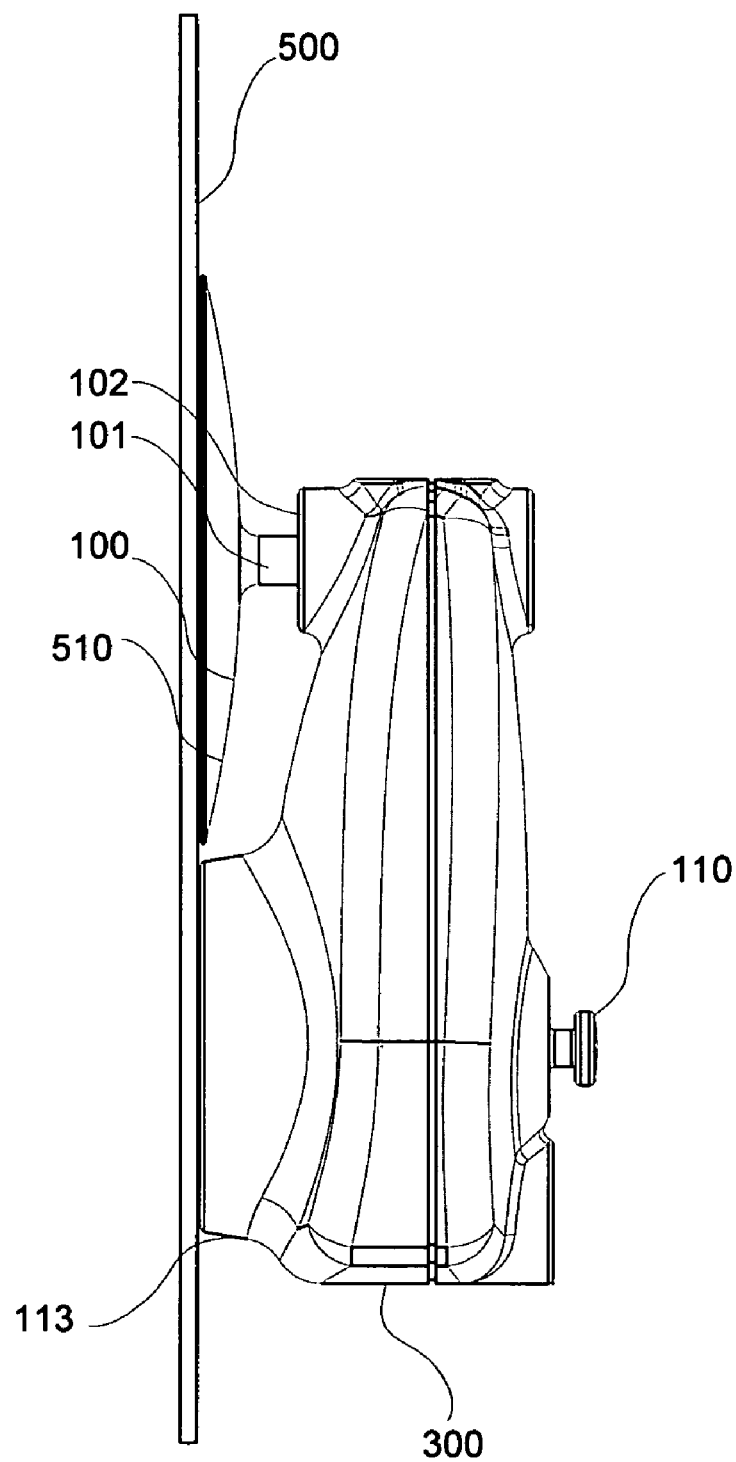
FIG. 5 is a side view of the present preferred wired network camera where the network camera is mounted on a window with a suction cup mounting assembly connected to the front of the network camera and where the network camera views information through the window or transparent medium.

FIG. 5 is a side view of the present preferred wired network camera 300 where the network camera 300 is mounted on a window or transparent medium 500 with a suction cup mounting assembly 125 connected to the front 510 of the network camera 300 and where the network camera 300 views information through a window or transparent medium 500. The network camera 300 is mounted to a window 500 or other transparent medium by the suction cup 100 which is connected to the front attachment point 102 via the suction cup attachment 101. This allows the network camera 300 to be mounted flush to the window or transparent medium 500. The suction cup attachment 101 screws into the front attachment point 102. However, in other envisioned alternative embodiments, other types of fastening devices can be used in place of threads/screws such as snaps, rivets, plugs, Velcro, connectors, pins, and the like. The glare shield 113 mounts flush to the window or transparent medium 500 and is used to reduce or eliminate glare reflected by the window or transparent medium 500 or from other typical sources which is seen by the image sensor 109 and via the network camera lens 108. The positioning knob 110 is used to change the viewing angle of the image sensor 109 which allows the network camera 300 to properly view an image.

Figure 6:
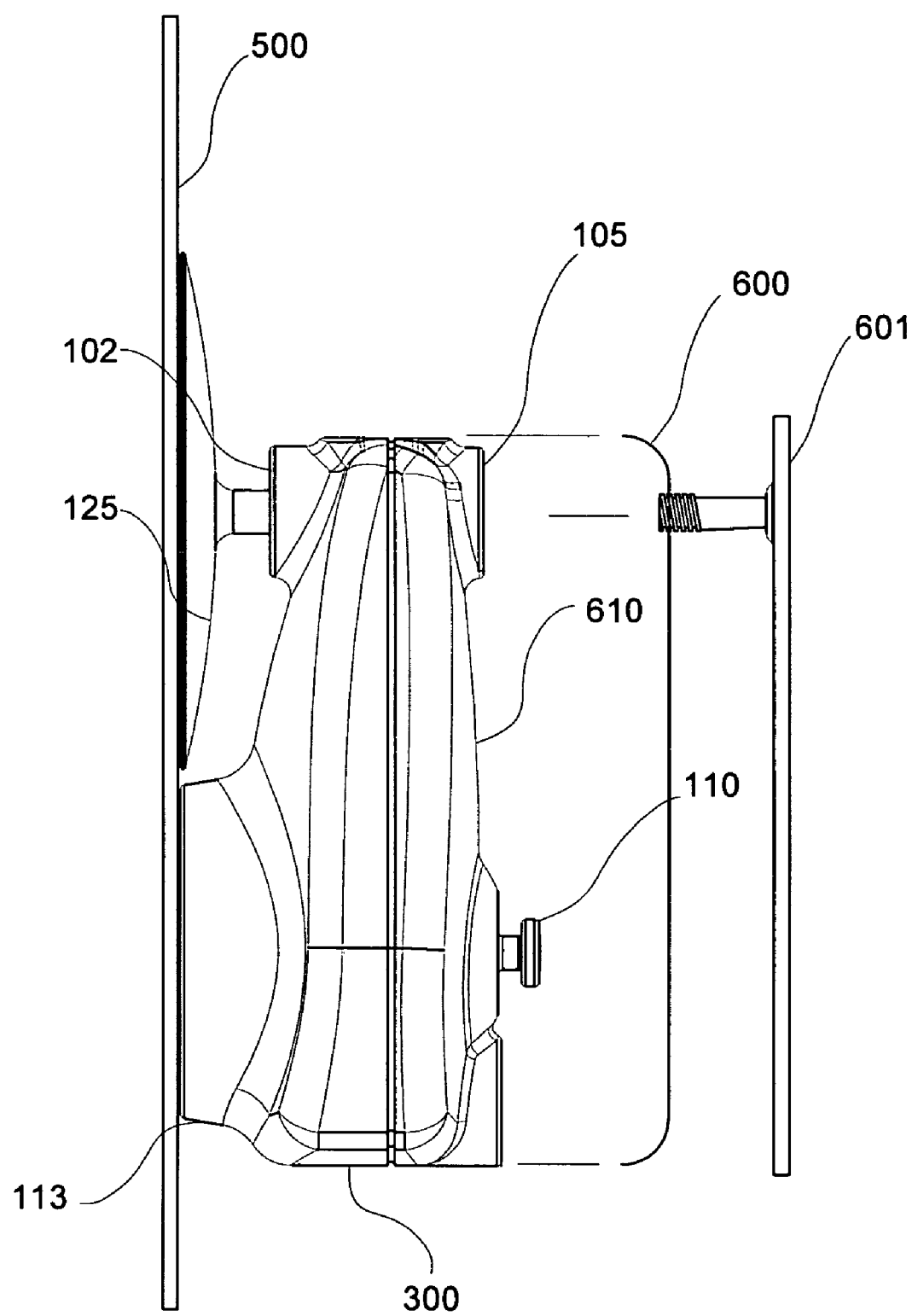
FIG. 6 is a side view of the present preferred wired network camera where the network camera is mounted on a window with a suction cup mounting assembly and where the network camera views information through the window and a cover is placed over the back of the network camera.

FIG. 6 is a side view of the present preferred wired network camera 300 and network camera mounting system where the network camera 300 is mounted on a window or transparent medium 500 with a suction cup mounting assembly 125 and where the network camera 300 views information through the window or transparent medium 500 and a cover 600 or 601 is placed over the back 610 of the network camera 300. The network camera 300 is mounted to a window or other transparent medium 500 by the suction cup mounting assembly 125 which is connected to the front attachment point 102. The suction cup attachment 101 screws into the front attachment point 102. However, in other envisioned alternative embodiments, other types of fastening devices can be used in place of threads/screws such as, but not limited to snaps, rivets, plugs, Velcro, connectors, pins, and the like. The glare shield 113 is used to reduce or eliminate glare from the window 500 seen by the image sensor 109. The positioning knob 110 is used to change the viewing angle of the image sensor 109 which allows the network camera 300 to properly view image. A flush mounting back cover 600 or a back cover 601 are used to decorate, effectively conceal, or cause the network camera 300 including the positioning knob 110 and the rear attachment point 105 to not be visually obvious. The flush mounting back cover 600 snaps on to the network camera 300. The back cover 601 connects to the network camera 300 at the rear attachment point 105.

Figure 7:
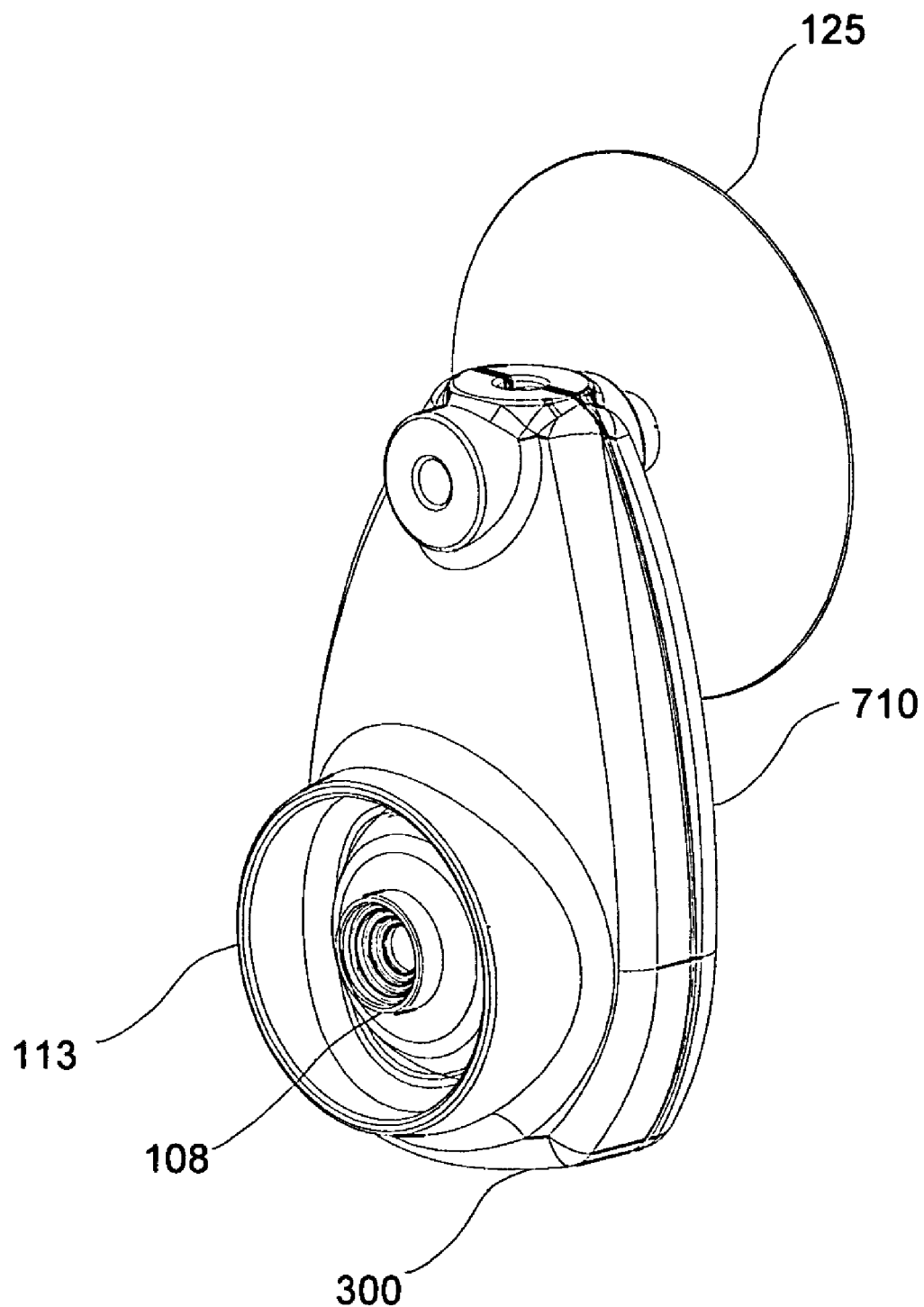
FIG. 7 an is angled view of the present preferred wired network camera with a suction cup mounting assembly connected to the back of the network camera.

FIG. 7 is an angled view of the present preferred wired network camera 300 with a suction cup mounting assembly 125 connected to the back 710 of the network camera 300.

The suction cup mounting assembly 125 is mounted on the back 710 of the network camera 300. The image sensor 109 sees through the network camera lens 108 and the glare shield 110. The network camera 300 attaches to a surface (not shown) via the suction cup mounting assembly 125. The suction cup mounting assembly 125 is connected to the network camera 300 at the rear attachment point 105. This allows the network camera 300 to view information away from a surface (not shown) on which the network camera 300 is attached.

Figure 8:
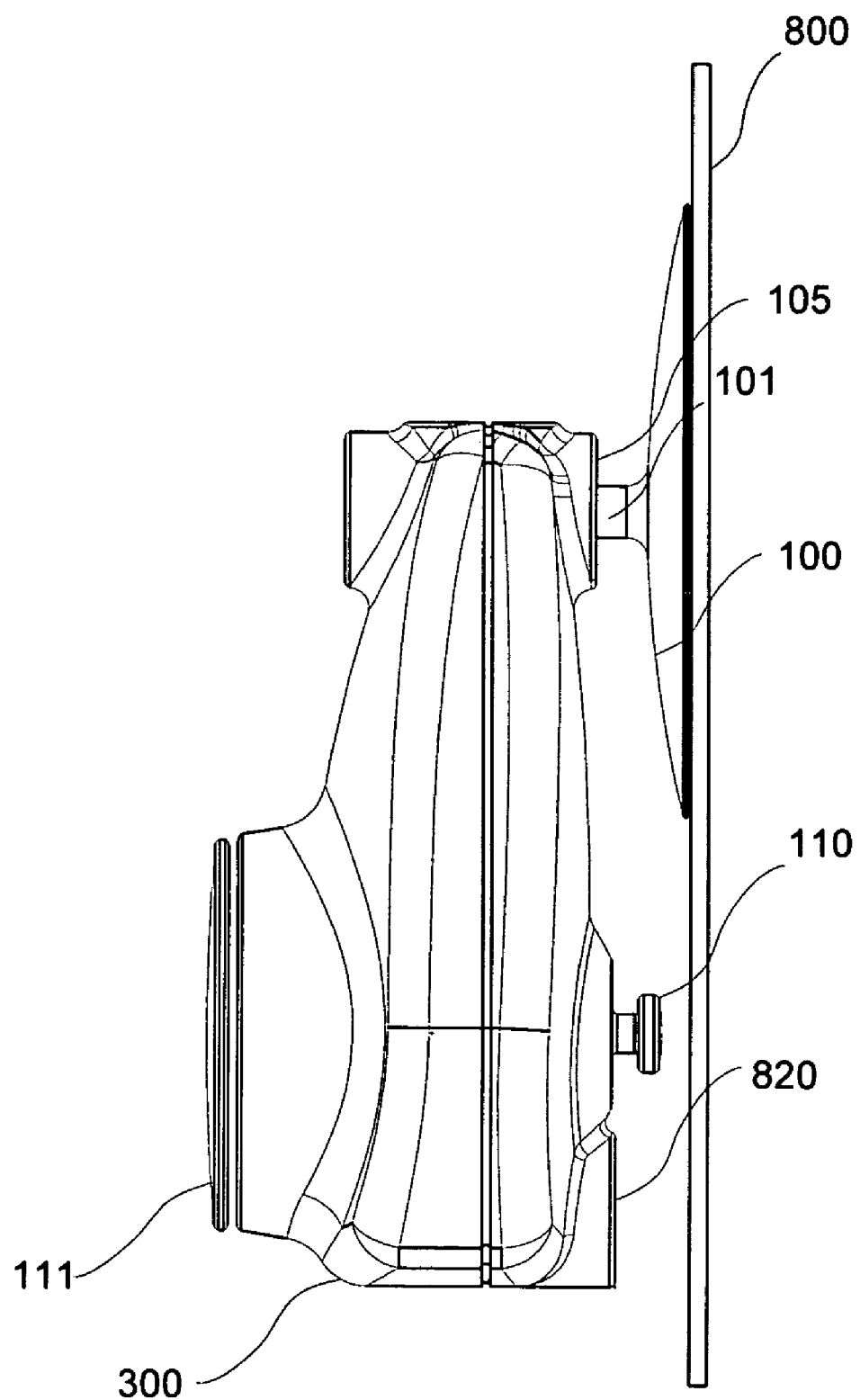
FIG. 8 is a side view of the present preferred wired network camera where the network camera is mounted on a window or other surface with a suction cup mounting assembly connected to the rear of the network camera and where the network camera views information away from the window or other surface.

FIG. 8 is a side view of the present preferred wired network camera and network camera mounting system 300 where the network camera 300 is mounted on a window or other medium 800 with a suction cup mounting assembly 125 connected to the rear 820 of the network camera 300 and where the network camera 300 views information away from the window or other medium 800. For this embodiment, the window or other medium 800 need not be transparent. The network camera 300 is mounted to a window or other medium 800 by the suction cup 100 which is connected to the rear attachment 105 via the suction cup attachment 101. The suction cup attachment 101 screws into the rear attachment point 105. However, in other envisioned alternative embodiments, other types of fastening devices can be used in place of threads/screws such as snaps, rivets, plugs, Velcro, connectors, pins, and the like. The clear lens cap 111 is used to keep the network camera 300 weatherproof/weather resistant and too allow the network camera 300 to properly view information. The positioning knob 110 is used to change the viewing angle of the video sensor 108 which allows the network camera 300 to properly view an image.

Figure 9:
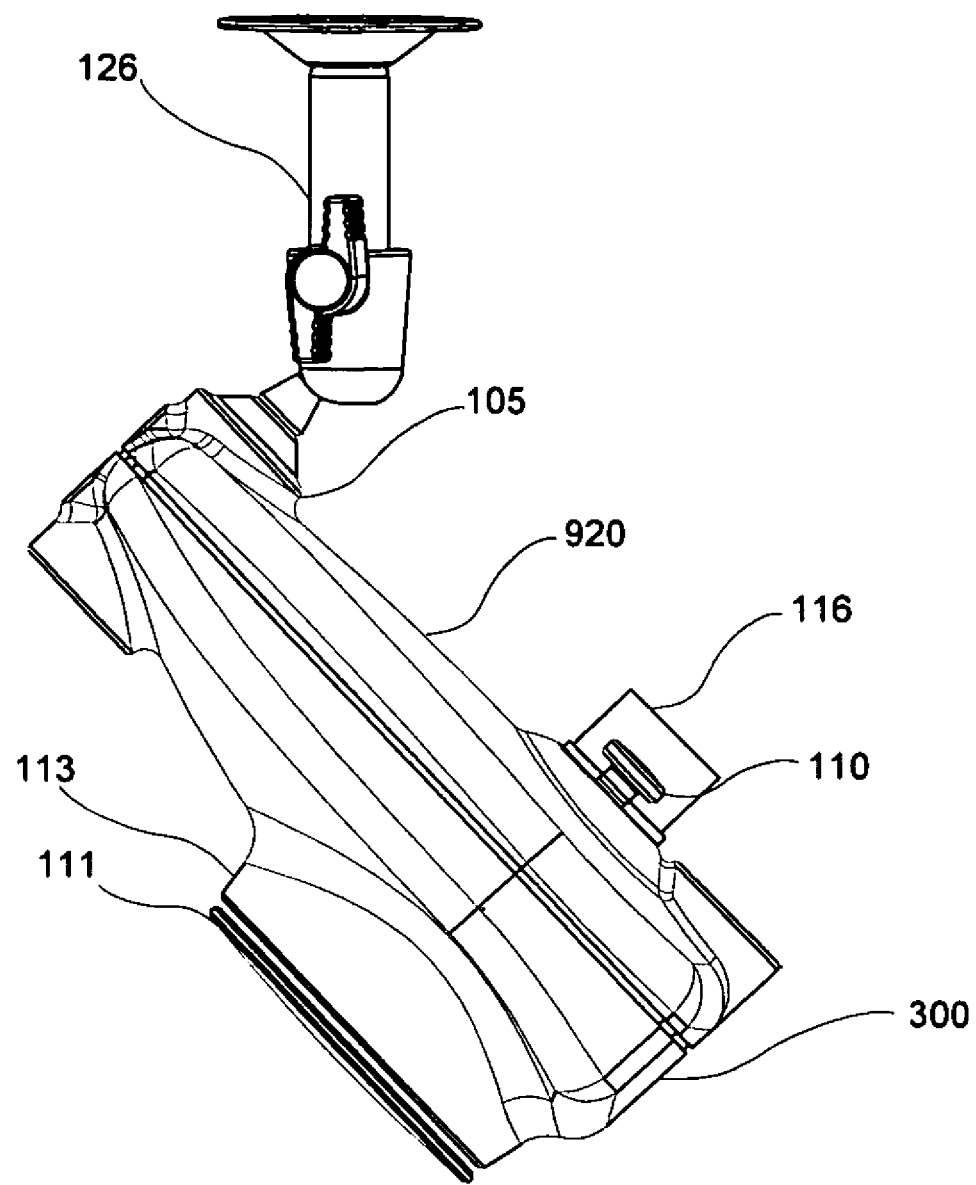
FIG. 9 is a side view of the present preferred network camera that is mounted with a bracket mounting assembly attached to the rear of the network camera.

FIG. 9 is side view of the present preferred network camera 300 that is mounted with a bracket mounting assembly 126 attached to the rear 920 of the network camera 300. The bracket mounting assembly 126 is connected to the network camera 300 via the rear attachment point 105. The bracket mounting assembly 126 connects to a wall, ceiling, floor, and the like. The bracket mounting assembly 126 is connected to the rear attachment point 105 which is connected to the network camera 300. This allows the viewing angle of the network camera 300 to be adjusted with the bracket mounting assembly 126 and/or the positioning knob 110 so the network camera 300 can view information in the opposite direction as the bracket mounting assembly 126. The bracket mounting assembly 126 still allows the network camera 300 to be mounted flush to a window or transparent surface (not shown).

Figure 10:
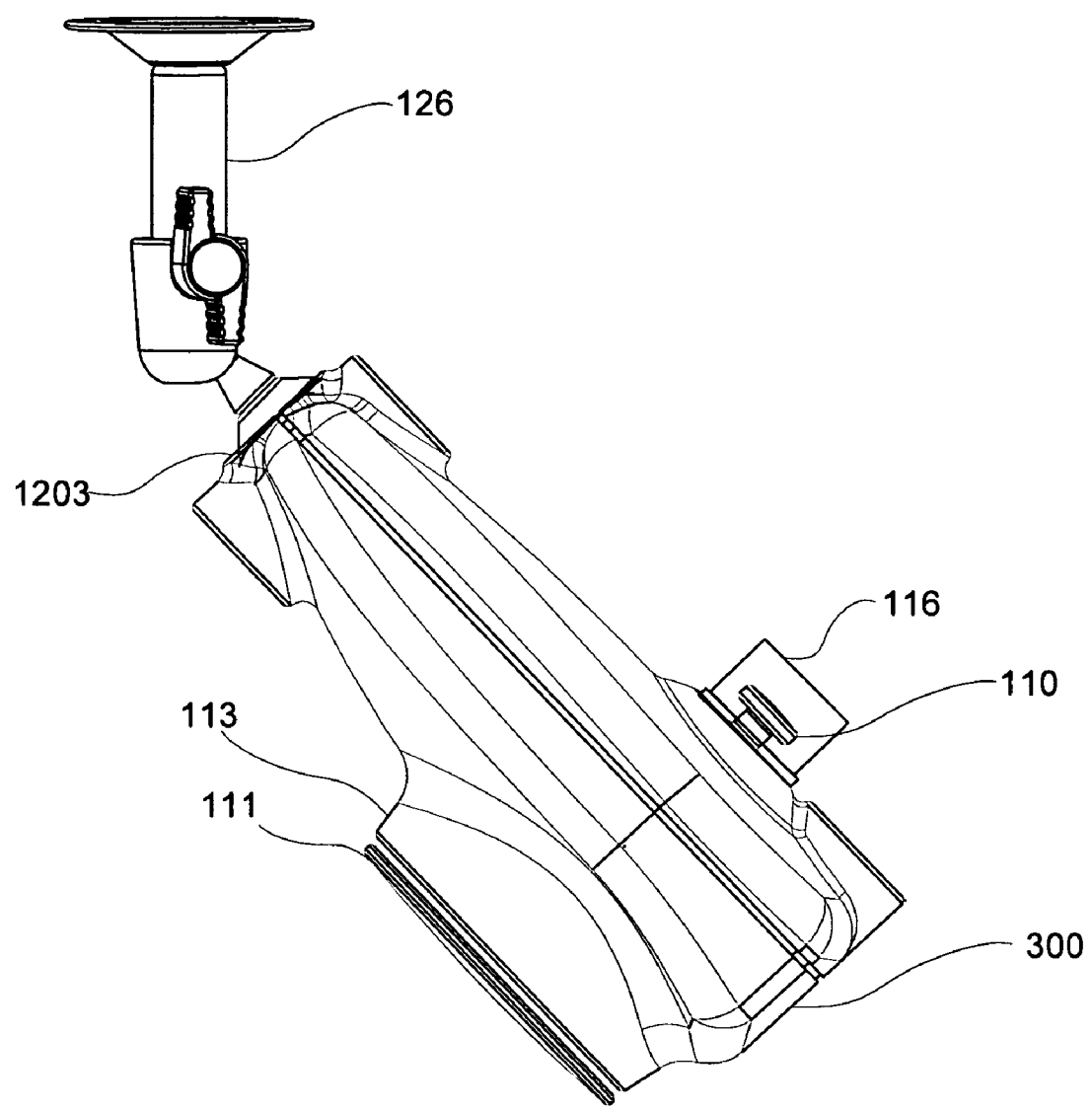
FIG. 10 is a side view of the present preferred network camera that is mounted with a bracket mounting assembly connected to the front of the network camera.

FIG. 10 is side view of the present preferred network camera 300 that is mounted with a bracket mounting assembly 126 connected to the top of the network camera 300. The bracket mounting assembly 126 is connected to the network camera 300 via the top attachment point 1203. The bracket mounting assembly 126 connects to a wall, window, ceiling, floor, and the like. The bracket mounting assembly 126 is connected to the top attachment point 1203 which is connected to the network camera 300. This allows the viewing angle of the network camera 300 to be adjusted with the bracket mounting assembly 126 and/or the positioning knob 110 so the network camera 300 can view information in different directions.

Figure 11:
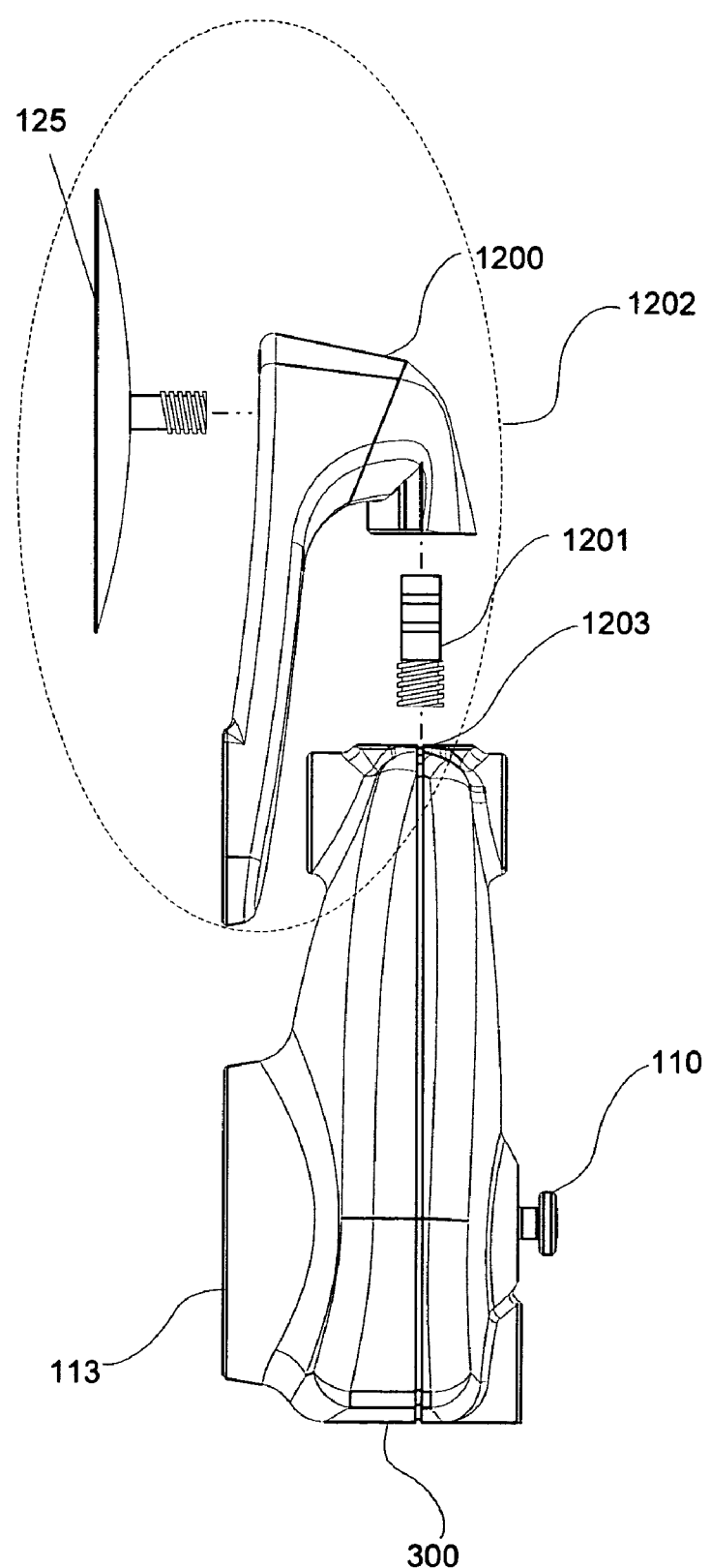
FIG. 11 is a side view of the present preferred network camera that is mounted with a multi-purpose suction cup mounting assembly that allows the network camera to view information through a window or transparent surface.

FIG. 11 is a side view of the present preferred network camera 300 that is mounted with a multi-purpose suction cup mounting assembly 1202 that allows the network camera 300 to view information through a window or transparent surface 1300. The multi-purpose suction cup mounting assembly 1202 includes a suction cup 125, the multi-purpose mounting bracket 1200 and the attachment screw 1201. The suction cup assembly 125 connects to the multi-purpose mounting bracket 1200. The present preferred embodiment uses threads to screw suction cup assembly 125 into the multi-purpose mounting bracket 1200. The attachment screw 1201 connects to the multi-purpose mounting bracket 1200. Both the suction cup 125 and the attachment 1201 screw can be connected using a variety of methods, but are not limited to snaps, rivets, plugs, Velcro, connectors, pins, and the like. In the preferred embodiment, the multi-purpose suction cup mounting assembly 1202 connects to the top attachment point 1203 by screwing the attachment screw 1201 into the top attachment point 1203 and then snapping the top of attachment screw 1201 into the multi-purpose mounting bracket 1200. This allows the network camera 300 to be mounted to a window, transparent surface and the like 1300.

Figure 12:
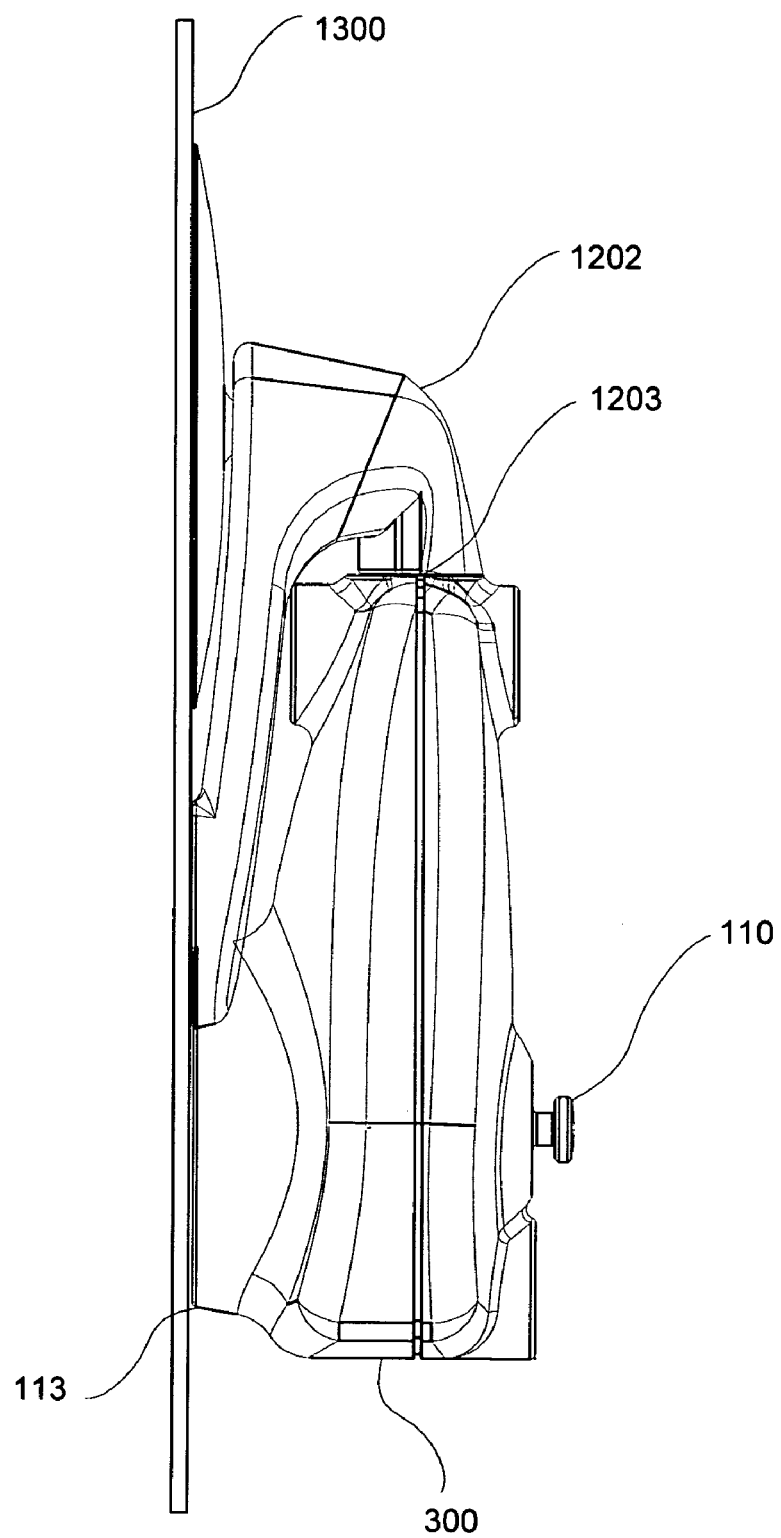
FIG. 12 is a side view of the present preferred network camera that is mounted with a multi-purpose suction cup mounting assembly with the network camera mounted to a window or transparent surface.

FIG. 12 is a side view of the present preferred network camera 300 that is mounted with a multi-purpose suction cup mounting assembly 1202 with the network camera 300 mounted to a window or transparent medium 1300. The multi-purpose suction cup mounting assembly 1202 connects to the window or transparent medium 1300 by suctioning to the window or transparent medium 1300. The multi-purpose suction cup mounting assembly 1202 which is connected to the network camera 300 at the top connection point 1203 holds the network camera 300 so that the glare shield 113 is against the window or transparent medium 1300 which reduces glare into the network camera 300. The user then can adjust the viewing angle of the network camera 300 by moving the positioning knob 110.

Figure 13:
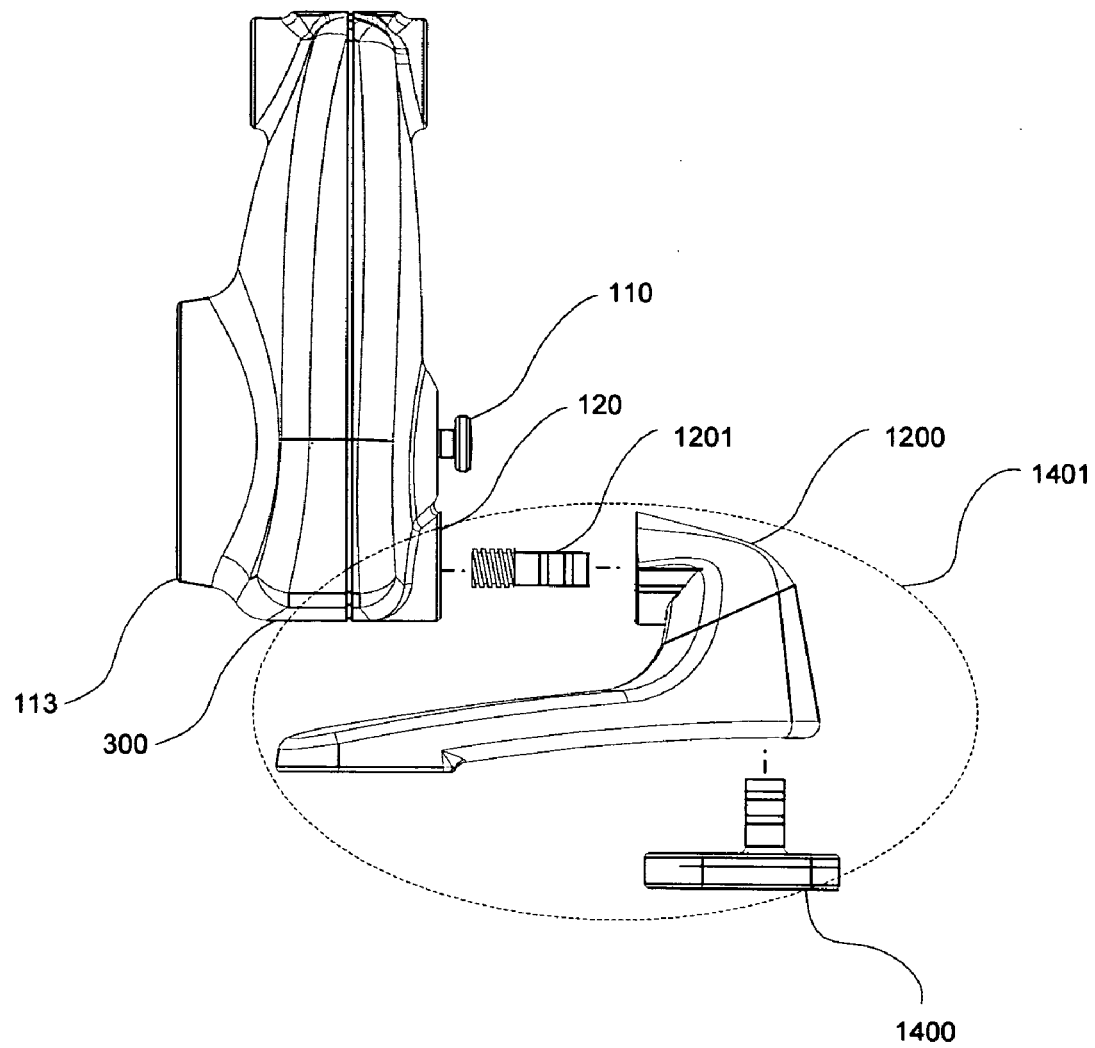
FIG. 13 is a side view of the present preferred network camera that is attached to a multi-purpose flat mounting assembly that allows the camera to be mounted on a surface.

FIG. 13 is a side view of the present preferred network camera 300 that is attached to a multi-purpose flat mounting assembly 1401 that allows the network camera 300 to be mounted on a surface (not shown). The multi-purpose flat mounting assembly 1401 includes the attachment screw 1201, the multi-purpose mounting bracket 1200 and the attachment foot 1400. The attachment screw 1201 screws into the bottom rear attachment point 120 on the network camera 300 and then snaps into the multi-purpose mounting bracket 1200. The attachment foot 1400 connects into the multi-purpose mounting bracket 1200. This allows the multipurpose flat mounting assembly 1401 to hold the network camera 300 upright on a flat, angled, or somewhat level surface and the like (not shown).

Figure 14:
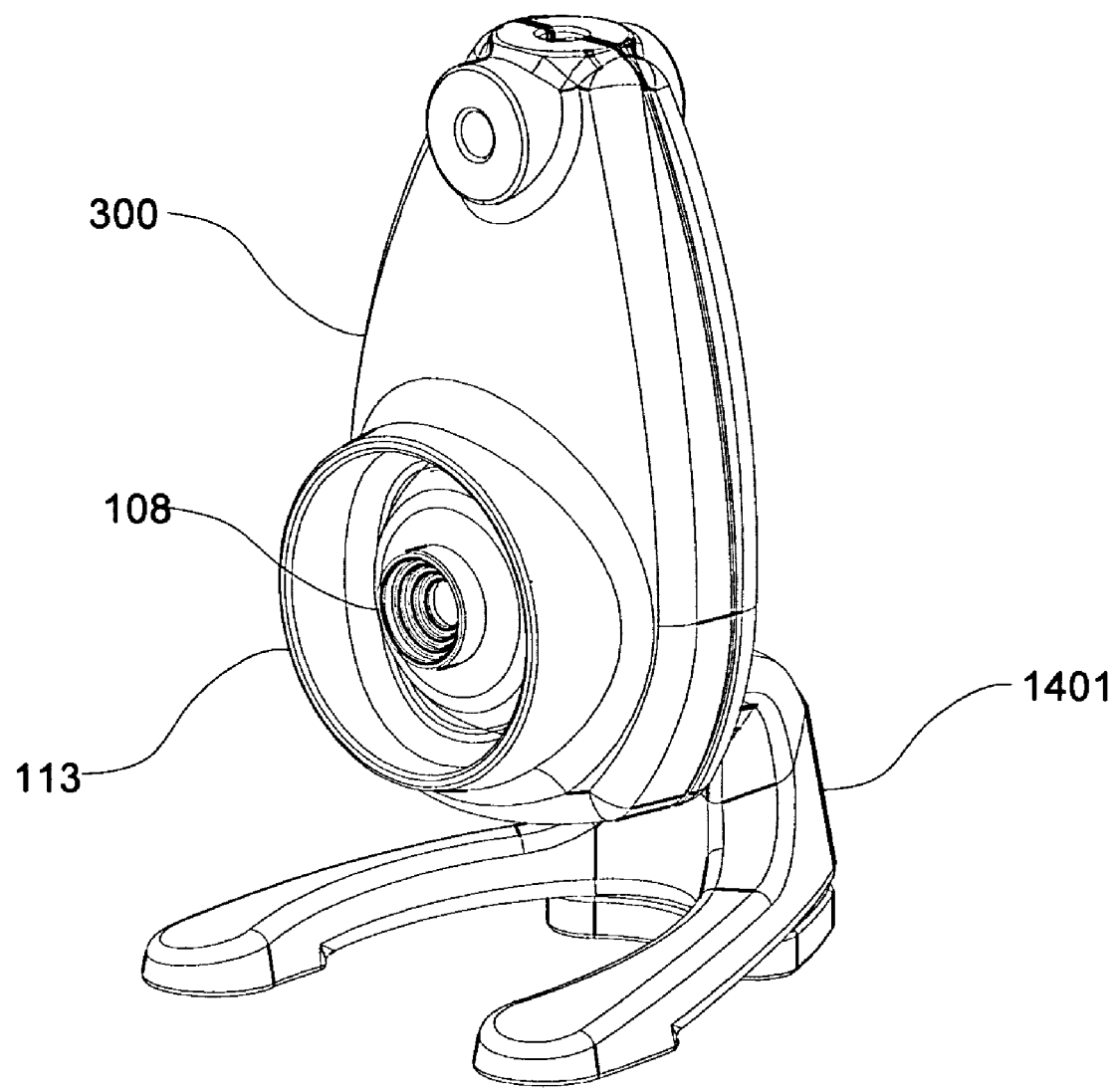
FIG. 14 is an angled view of the present preferred network camera that is attached to a multi-purpose flat mounting assembly that allows the camera to be mounted on a surface.

FIG. 14 is an angled view of the present preferred network camera 300 that is attached to a multi-purpose flat mounting assembly 1401 that allows the network camera 300 to be mounted on a surface (not shown). The multi-purpose flat mounting assembly 1401 is attached to the network camera 300. This allows the network camera to set on a surface (not shown) and view information through the network camera lens 108 and trough the glare shield 113.

Figure 15:
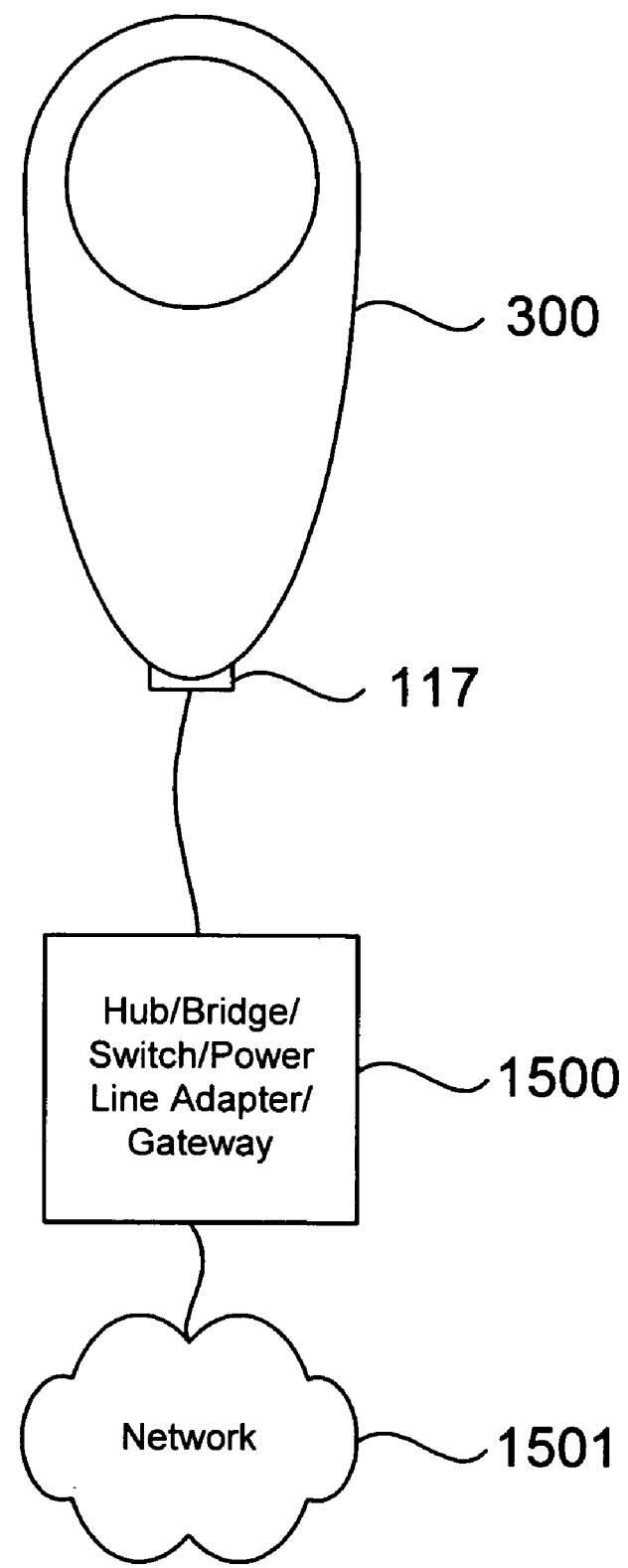
FIG. 15 is a block diagram of the present preferred network camera that is connected to a network device that switches between different types of protocols and/or networks.

FIG. 15 is a block diagram of the present preferred network camera 300 that is connected to a network device 1500 that switches between different types of protocols and/or networks. The network camera 300 is connected to a network device 1500 such as a hub, switch, bridge, router, gateway that converts from one or more protocols to one or more different protocols and/or networks. The conversion may occur at various levels in the Open System Interconnect model such as the physical layer, the data link layer, the network layer, the session layer, the transport layer, the application layer and the like. Another example can be a power line adapter that converts a protocol to second protocol that runs over the power lines in a home or business. The network device 1500 then connects to a second network 1501 that is using one or more different networking protocol. Examples of other types of networks can be, but are not limited to Ethernet, wireless (802.11b, 802.11a, 802.11l, 802.11e, 802.11g, 802.11n, 802.15.3a, 802.15.4, 802.16 and the like), power line (HomePlug, HomePlug A/V and the like), fiber optic (FDDI, Sonnet and the like), T1, T3, Telephone networks, and the like.

Figure 16:
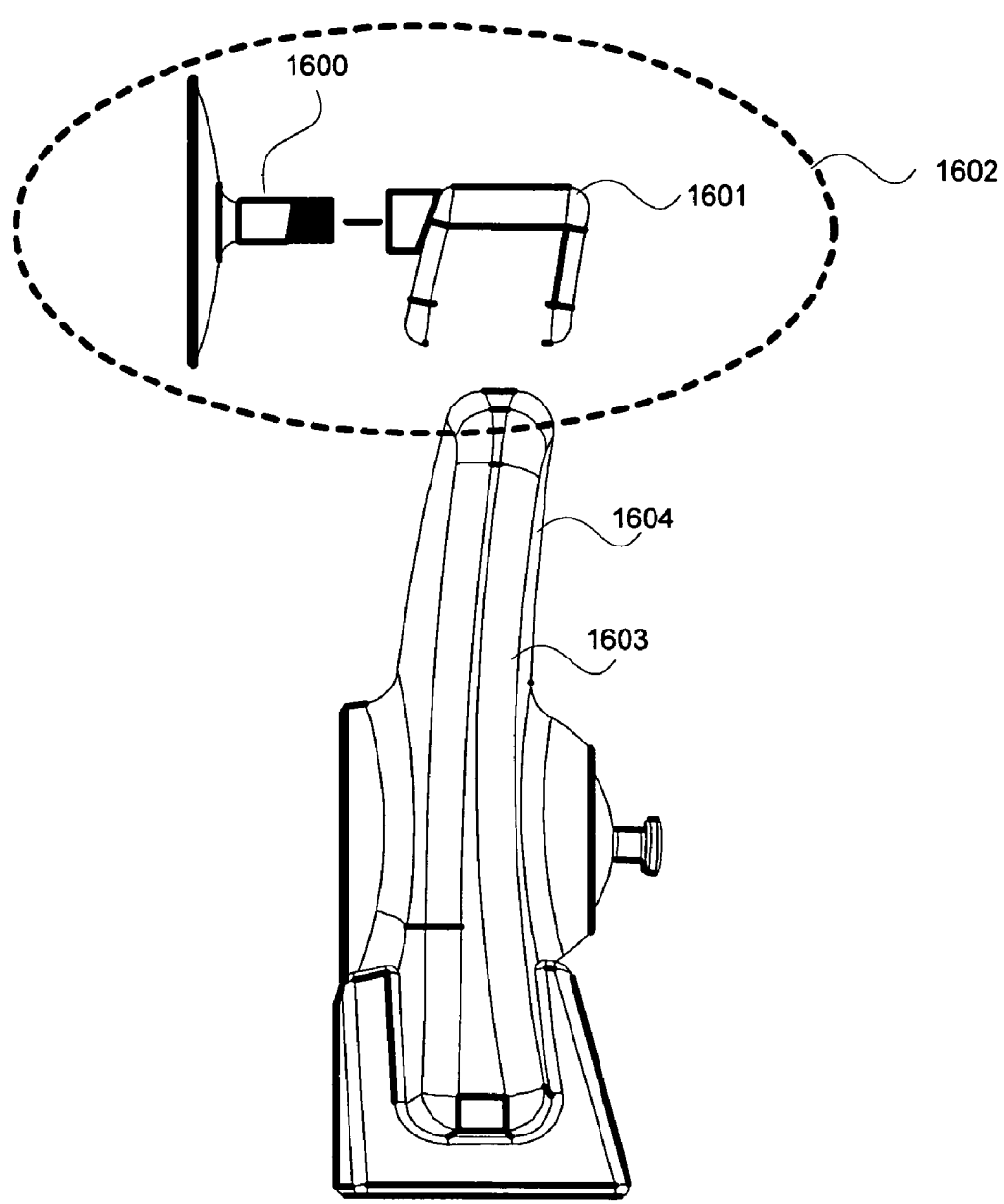
FIG. 16 is a side view of the present preferred network camera with a clip-on suction cup mounting assembly that can be clipped on to the network camera.

FIG. 16 is a side view of the present preferred network camera 1603 with a clip-on suction cup mounting assembly 1602 that can be clipped on to the network camera 1603. In the present preferred embodiment, the suction cup mounting assembly 1600, screws into the clip-on mounting assembly 1601, to form the clip on suction cup mounting assembly 1602. However, in other envisioned embodiments, other types of fastening devices can be used in place of screws/threads such as snaps, rivets, plugs, Velcro, connectors, pins, and the like. Other types of connection devices can screw into the clip-on mounting assembly such as those described FIGS. 1-14 and the like. The clip-on suction cup mounting assembly 1602 then slides over the clip-on attachment point 1604 which secures the clip-on suction cup mounting assembly 1602 to the network camera 1603.

Figure 17:
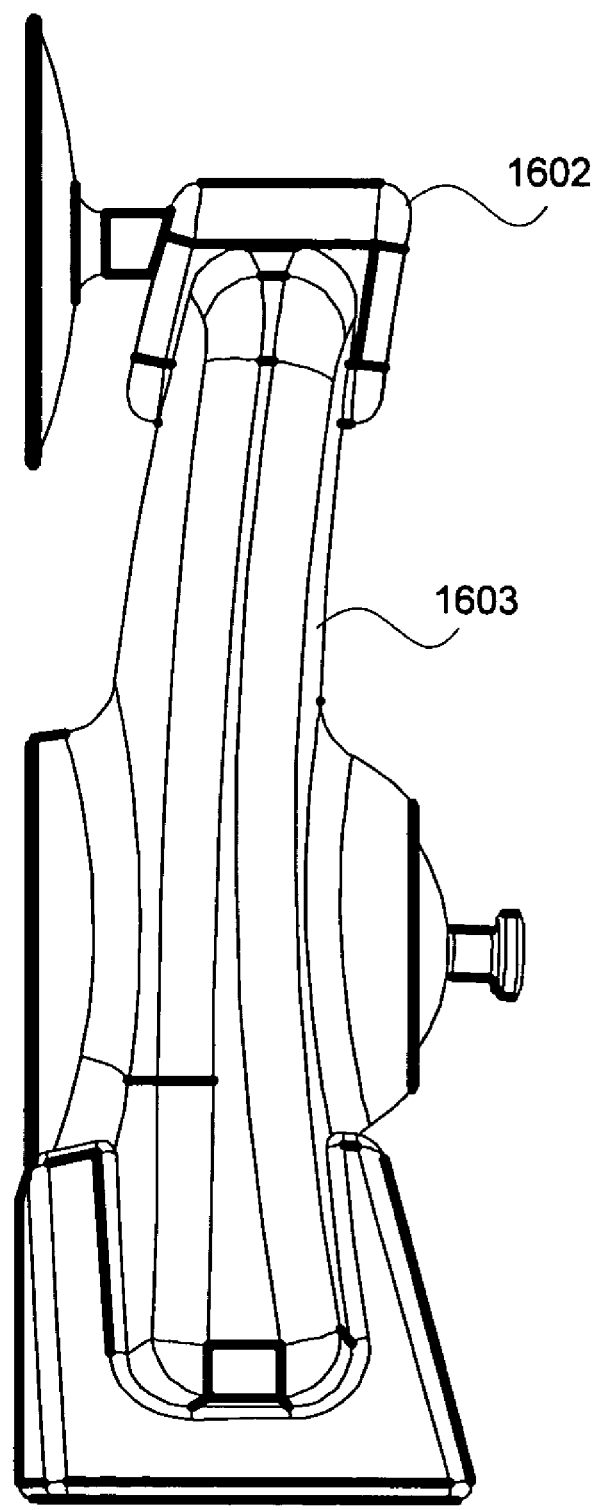
FIG. 17 is a side view of the present preferred network camera with an attached clip-on suction cup mounting assembly.

FIG. 17 is a side view of the present preferred network camera 1603 with an attached clip-on suction cup mounting assembly 1602. The clip-on suction cup mounting assembly 1602 has been slid over the clip-on attachment point 1604 which secures the clip-on suction cup mounting assembly 1602 to the network camera 1603 by exerting pressure on the network camera 1603. The clip-on suction cup mounting assembly 1602 is made of a flexible spring material or compression material and the like which allows the clip-on suction cup mounting assembly 1602 to secure the network camera 1603.

Each of the previously described and other envisioned embodiments of this invention can be constructed using a variety of materials, such as plastics, metals, composites, and the like. In addition, each of the embodiments can be machined, molded, and the like.

The described embodiments of this invention are to be considered in all respects only as illustrative and not as restrictive. Although specific diagrams are provided, the invention is not limited thereto. The scope of this invention is, therefore, indicated by the claims rather than by the foregoing description. All changes that come within the meaning and range of equivalency of the claims are to be embraced within their scope.

The invention claimed is:

1. A network video camera adapted for flush mounting comprising:
   a glare shield;
   a low profile camera housing comprising a shell, an end of the shell circumscribing an opening for receiving the glare shield, the end of the shell in a substantially circular shape and adapted for flush mounting in direct contact with an external transparent medium, the glare shield substantially in level with the end of the shell circumscribing the opening;
   an adjustable video sensor assembly within the low profile housing, wherein said video sensor assembly receives images through the glare shield and transmits the received images through a network interface;
   a positioning knob connected to the adjustable video sensor assembly for manually adjusting a viewing angle of the adjustable video sensor; and
   a first mounting assembly attached to the low profile camera housing and adapted for flush mounting the end of the shell circumscribing the opening in direct contact with the external transparent medium,
   wherein said first mounting assembly is connected to a mounting point located on the low profile housing above a center of gravity of the network video camera, the end of the shell pressed against the external transparent medium by weight of the network video camera, and
   wherein the low profile camera housing comprises a front mounting point for attaching to the first mounting assembly, and a bottom rear mounting point for attaching to a second mounting assembly, the second mounting assembly adapted to support the network video camera upright on a flat surface.

2. The network video camera as recited in claim 1, wherein the low profile camera housing further comprises a rear mounting point located at a rear of the low profile camera housing, the rear mounting point adapted for attaching to a third mounting assembly.

3. The network video camera as recited in claim 2, wherein the rear mounting point is further adapted for connecting to a back cover covering a rear of the low profile camera housing.

4. A network video camera mounting system comprising:
   a glare shield;
   a low profile camera housing comprising a shell covering an opening formed on the shell, an end of the shell circumscribing an opening for receiving the glare shield, the end of the shell in a substantially circular shape and adapted for flush mounting in direct contact with an external transparent medium, the glare shield substantially in level with the end of the shell circumscribing the opening, the low profile camera housing comprising:
      a first mounting point at an upper front portion of the low profile camera housing for attaching to a first mounting assembly, the first mounting assembly adapted for flush mounting the end of the shell in direct contact with the external transparent medium;
      a second mounting point at an upper rear portion of the low profile camera housing for attaching to a second mounting assembly; and
      a third mounting point at a lower rear portion of the low profile camera housing for attaching to a third mounting assembly;
   an adjustable video sensor assembly within the low profile housing comprising an image sensor, wherein the adjustable video sensor assembly receives images through the glare shield;
   a network interface which transmits images from the video sensor assembly; and
   a positioning knob connected to the adjustable video sensor assembly for manually adjusting a viewing angle of the adjustable video sensor.

5. The network video camera mounting system of claim 4, wherein the network interface is adapted to transmit the received images over a power line network.

6. The network video camera mounting system of claim 4, wherein the shell further comprises a fourth mounting point at the top of the shell for attaching to a fourth mounting assembly, the fourth mounting assembly adapted for flush mounting the end of the shell in direct contact with the external transparent medium when attached to the fourth mounting point, the fourth mounting assembly further attachable to the third mounting point to support the low profile camera housing upright on a flat surface.

7. The network video camera mounting system of claim 4, wherein the first mounting point is located above a center of gravity of the low profile camera housing, the end of the shell pressed against the external transparent medium by weight of the low profile camera housing.

* * * * *

UNITED STATES PATENT AND TRADEMARK OFFICE
CERTIFICATE OF CORRECTION

PATENT NO. : 7,599,002 B2
APPLICATION NO. : 10/774954
DATED : October 6, 2009
INVENTOR(S) : W. Paul Willes et al.

It is certified that error appears in the above-identified patent and that said Letters Patent is hereby corrected as shown below:

On the face page, in field (56), under "U.S. Patent Documents", in column 1, line 6, below "5,392,223 A 2/1995 Caci" insert -- 5,426,476 A 6/1995 Fussell et al. 354/74 --.

On the face page, in field (56), under "U.S. Patent Documents", in column 1, line 8, below "5,495,288 A 2/1996 Broady et al." insert -- 5,510,863 A 4/1996 Kliewer 354/81 --.

In column 1, line(s) 6–7, after "application is" delete "a continuation in part application claiming priority".

Signed and Sealed this

Twenty-ninth Day of December, 2009

David J. Kappos
*Director of the United States Patent and Trademark Office*